UNITED STATES PATENT OFFICE.

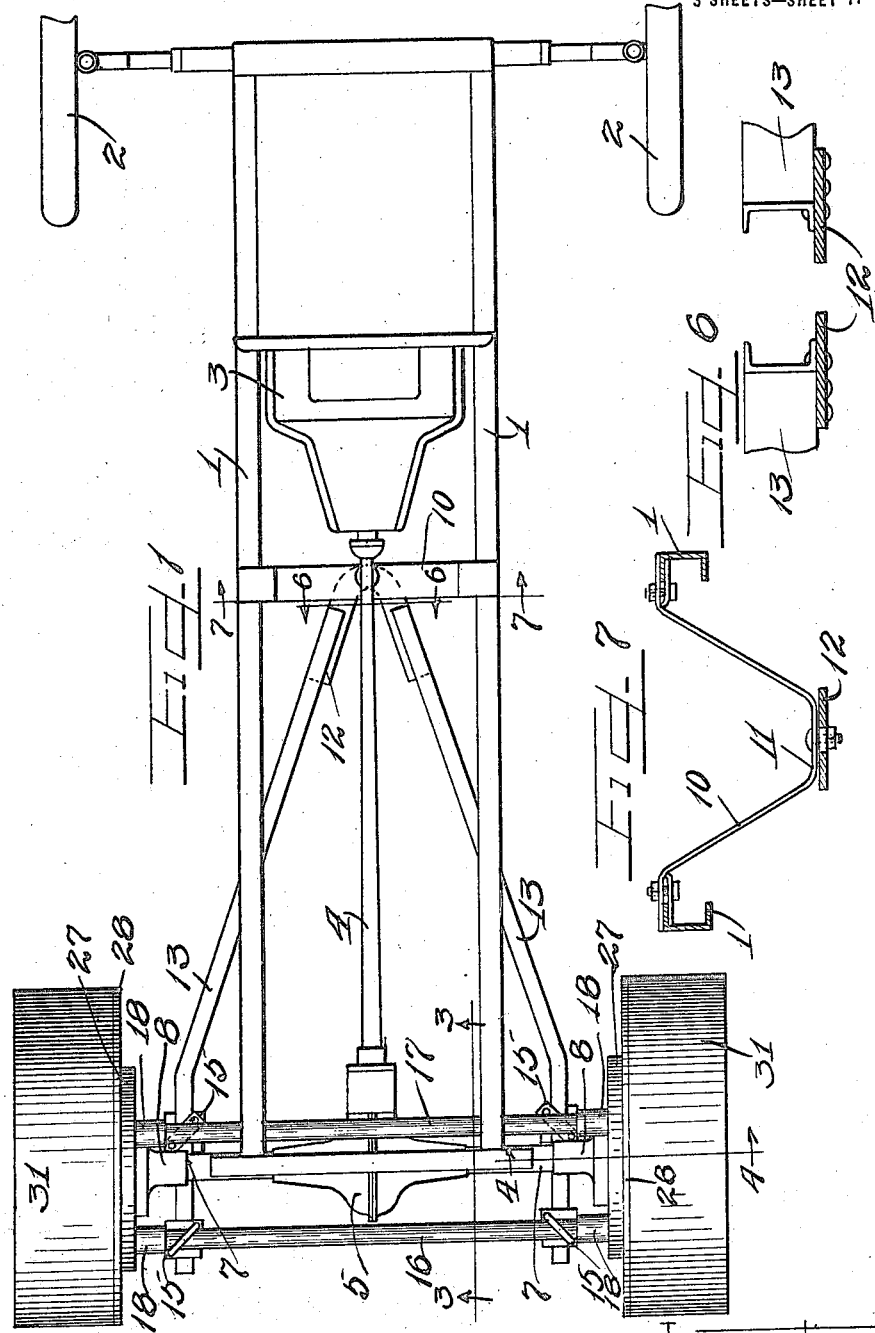

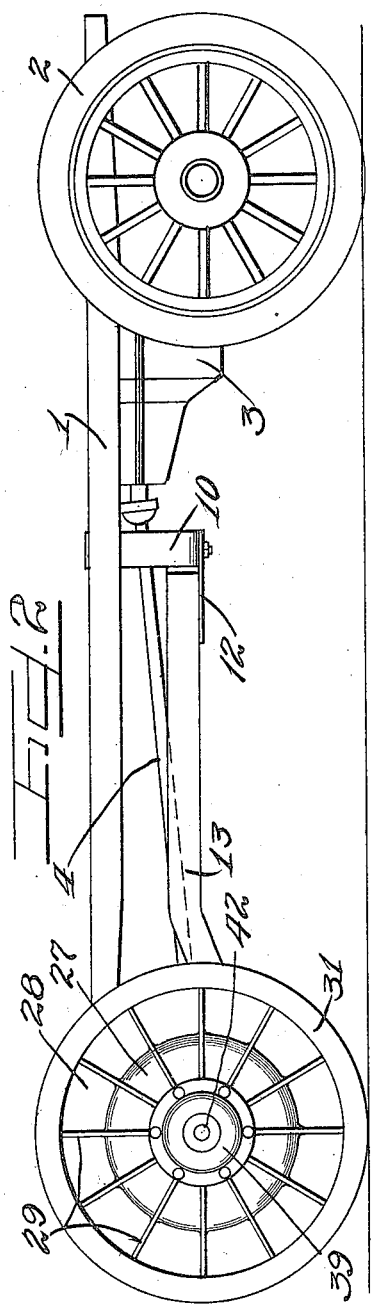

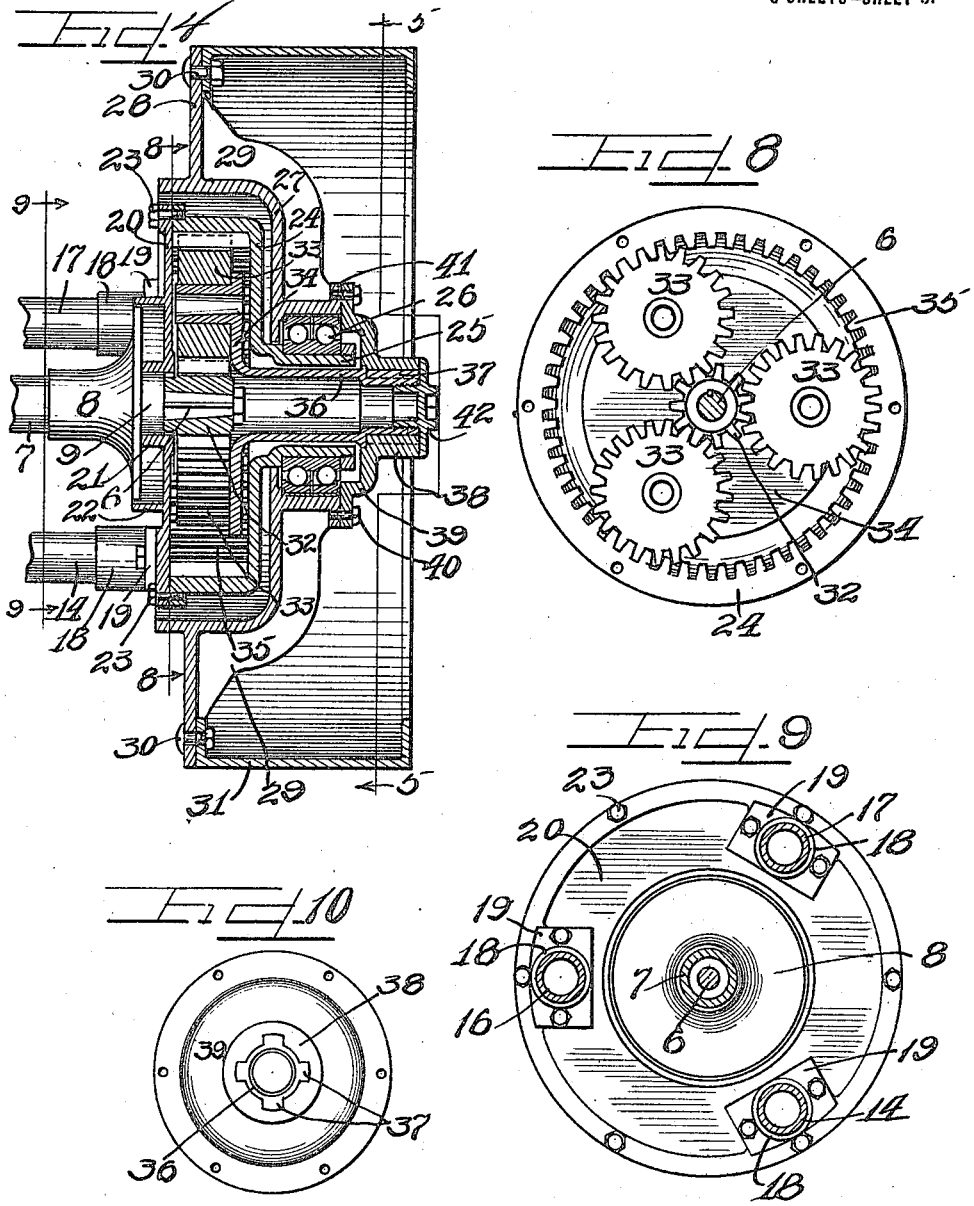

ALBERT E. COOK, OF EVANSTON, AND THOMAS VAN TUYL, OF KANKAKEE, ILLINOIS; SAID VAN TUYL ASSIGNOR TO SAID COOK.

AUTOMOBILE TRACTOR ATTACHMENT.

1,386,842.  Specification of Letters Patent.  Patented Aug. 9, 1921.

Application filed June 14, 1918. Serial No. 240,100.

*To all whom it may concern:*

Be it known that we, ALBERT E. COOK and THOMAS VAN TUYL, citizens of the United States, and residents of the city of Evanston, in the county of Cook and State of Illinois, and of the city of Kankakee, in the county of Kankakee and State of Illinois, respectively, have invented certain new and useful Improvements in Automobile Tractor Attachments; and we do hereby declare that the following is a full, clear, and exact description of the same, reference being had to the accompanying drawings and to the numerals of reference marked thereon, which form a part of this specification.

This invention relates to an improved form of a tractor attachment adapted to be removably secured to the chassis and rear driving axles of an automobile whereby a drive transmitted by the motor of the automobile is changed by speed change wheels forming a part of the tractor attachment.

It is an object of this invention to provide a detachable tractor attachment for a motor driven vehicle.

It is also an object of this invention to construct a speed change automobile tractor attachment wherein the wheels of the device are connected with one another.

Another object of the invention is the construction of an automobile tractor attachment having the hub members of the speed change wheels rigidly secured to one another by means of a transverse supporting frame.

A further object of this invention is the construction of an automobile tractor attachment wherein the speed change tractor wheels have the gear casings thereof rigidly secured to each other by means of transverse supporting members.

It is furthermore an object of this invention to construct an automobile tractor attachment wherein the speed change wheels have the gear casings thereof secured to each other by means of transverse cross-rods which are rigidly secured to a frame attached to the chassis of the automobile.

It is a further object of the invention to provide a vehicle tractor attachment wherein the speed change tractor wheels are provided with dust-proof gear inclosing means.

It is an important object of this invention to provide an improved form of an automobile tractor attachment of simple and effective construction wherein the wheels have the speed change gear drums thereof rigidly connected together by means of a plurality of brace members disposed around and parallel to the rear axles of the automobile and prevented from rotating by means of an auxiliary frame secured to the chassis of the automobile.

Other and further important objects of this invention will be apparent from the disclosures in the drawings and specification.

The invention (in a preferred form) is illustrated in the drawings and hereinafter more fully described.

On the drawings:—

Figure 1 is a top plan view of an automobile chassis equipped with a tractor attachment embodying the principles of this invention.

Fig. 2 is a side elevation thereof.

Fig. 3 is an enlarged sectional view taken on line 3—3 of Fig. 1, with parts omitted.

Fig. 4 is an enlarged section taken on line 4—4 of Fig. 1, with parts in elevation.

Fig. 5 is a reduced sectional view taken on line 5—5 of Fig. 4.

Fig. 6 is an enlarged fragmentary detail section taken on line 6—6 of Fig. 1.

Fig. 7 is an enlarged sectional view taken on line 7—7 of Fig. 1.

Fig. 8 is a detail view on line 8—8 of Fig. 4.

Fig. 9 is a fragmentary detail sectional view taken on line 9—9 of Fig. 4.

Fig. 10 is an outer end view of the drum closure member.

As shown on the drawings:—

The reference numeral 1, indicates the sills of an automobile chassis, 2 the front wheels, 3 the engine, and 4 the driving shaft mechanism, which is connected with a differential 5, which drives the rear driving axles 6, disposed within axle sleeves 7. Secured near the outer end of each of the axle sleeves 7, is a flared collar 8, beyond which the respective sleeves 7, project as denoted by the reference numeral 9.

The framework of the tractor attachment is removably secured to the chassis of the automobile and comprises a U-shaped support or bracket 10, having a flat central portion 11. The bracket 10, is disposed transversely of the chassis to the rear of the engine 3, and has the upper ends thereof rigidly but removably clamped to the chassis sills 1, as clearly shown in Fig. 7. Secured to the flat portion 11, of the bracket 10, is a bow plate or curved bar 12, the arms of which are rearwardly and outwardly directed. Rigidly secured to each of the bow plate arms is the forward or front end of a channel iron brace 13, which is directed outwardly at an angle to the chassis sills and has the rear portion thereof depressed and directed rearwardly in a plane parallel to the chassis sills. The rear ends of the braces 13, are disposed below the sleeves 7, and extend to the rear thereof. A brace pipe or tube 14, is disposed below and extends transversely of the rear portions of the braces 13, in front of and parallel to the axle sleeves 7. Said brace tube 14, is rigidly secured to said braces 13, by means of clamps 15. Another brace pipe or tube 16, is disposed above and transversely of the braces 13, to the rear of and parallel to the axle sleeves 7. The brace tube 16, is also rigidly secured to the braces 13, by means of clamps 15. Another brace pipe or tube numbered 17, is disposed parallel to the brace tubes 14 and 16, and is positioned above and to the front of the axle sleeves 7. Rigidly secured on each end of each of the brace tubes 14, 16 and 17, is a collar 18, having integrally formed at right angles thereto a flange or attaching plate 19.

The speed change tractor wheels which form a part of the tractor attachment are identical in construction and the description of one thereof will only be given. The attaching plates 19, disposed at one end of the frame of the tractor attachment are all rigidly secured to the outer surface of a stationary gear casing plate 20, provided with an integral hub 21, which is engaged on the portion 9, of the axle sleeve 7. Said plate 20, is also provided with an integral flange ring 22, which is disposed around the flared portion of the collar 8. The plate 20, is provided with an apertured rim to the inner face of which is rigidly secured by means of screw bolts 23, the apertured flange of a gear casing 24, having integrally formed thereon a bearing sleeve or collar 25, upon which is mounted a ball bearing ring 26, for rotatably supporting a wheel drum 27, which incloses the gear casing and the ball bearing ring. Integrally formed at right angles to the wheel drum 27, is a wheel plate 28, which is reinforced by means of a plurality of radially directed reinforcing ribs or webs 29, integrally formed on said drum 27, and the plate 28. The peripheral margin of the wheel plate 28 is provided with a plurality of openings or apertures through which bolts 30, project and rigidly hold a channel cross-sectioned wheel rim 31, secured to the wheel plate 28, to inclose the wheel drum.

As clearly shown in Fig. 4, the outer end of the axle 6, projects through the portion 9, of the sleeve 7, into the gear casing and has rigidly secured thereon a small driving gear 32, which meshes with a plurality of gears 33, rotatably mounted on a spider 34, which is rotatably disposed within the gear casing. The gears 33, are in mesh with an internal gear 35, integrally formed on the inner peripheral surface of the casing member 24. Integrally formed on the spider 34, is a hub or sleeve 36, which projects through the stationary collar 25, and has integrally formed on the outer portion thereof a plurality of keys or teeth 37. Lockingly engaged with the keys 37, of the spider hub 36, is an internally grooved or slotted collar 38, integrally formed on a flanged drum closure plate or member 39, having apertures in the flange thereof to receive screw bolts 40, which rigidly hold the drum closure plate 39, attached to an apertured flange 41, integrally formed on the wheel drum 27. Removably threaded into the hub 36, is a cap 42.

The operation is as follows:

As clearly shown in Fig. 1, the tractor attachment frame is rigidly and removably clamped to the chassis sills 1, with the brace tubes 14, 16 and 17, rigidly secured to the casing plates 20, to hold the gear casings 24, stationary. A drive from the motor 3, is transmitted to the driving axles 6, through the driving shaft mechanism 4, and the differential 5. Rotation of the axles 6, cause rotation of the driving gears 32, which being in mesh with the gears 33, rotate the same. The gears 33, meshing with the stationary internal gears 35, travel therearound carrying the spiders 34, therewith, whereby the drive is transmitted through the hubs 36, to the drum plates 39, and to the wheel rims 31, which are rotated at a rate of speed which is different from that transmitted by the motor 3, due to the ratio of the speed change gears of the tractor wheels.

It will be noted that the speed change gear casings of the tractor wheels are connected to one another and are prevented from rotating by means of the brace tubes 14, 16 and 17, two of which are rigidly clamped to the rear ends of the channel iron braces 13. The front ends of the braces 13, are supported by means of the bow plate 12, which is attached to the support 10, the ends of which are clamped on the chassis sills 1. From the description of the tractor attachment, it will be seen that the same may be readily mounted in position on an automobile chassis without requiring any changes to be made, except the removal of the automobile rear wheels.

We are aware that numerous changes may be made, and various details of construction may be varied through a wide range without departing from the principles of this invention, and we therefore do not purpose limiting the patent granted otherwise than necessitated by the prior art.

We claim as our invention:

1. An automobile tractor attachment embracing supporting means, a plurality of transverse brace members secured thereto, gear casings secured to said brace members, speed reduction gear mechanisms in said gear casings, and wheel members rotatably mounted on said gear casings and connected with said speed reduction gear mechanisms to be driven thereby at a rate of speed different from that received by said speed reduction gear mechanisms.

2. The combination with an automobile, of a framework removably secured to the automobile chassis sills, transverse brace members on said framework, casings rigidly secured to the ends of said brace members, speed reduction means therein, wheels rotatably mounted on said casings, and means connected with said speed reduction means and with said wheels to transmit a changed drive from said speed reduction means to said wheels.

3. The combination with a motor driven vehicle and the driving axles thereof, of a frame removably secured to said vehicle, a plurality of brace members disposed parallel to the driving axles and rigidly secured to said frame, casings secured on the ends of said brace members, speed reduction gear mechanisms within said casings connected with the driving axles to receive and change a drive therefrom, wheels rotatably mounted on said casings, and means connected with said speed reduction gear mechanisms and with said wheels adapted to transmit a reduced drive from said mechanisms to said wheels.

4. The combination with an automobile chassis frame and driving axle, of a framework secured to said chassis frame, a plurality of brace members supported on said framework parallel and equidistantly from different sides of said driving axle, casings secured on the ends of said brace members co-axial with said driving axle, wheels co-axial with the driving axle and rotatably mounted on said casings, and gear mechanisms in said casings and connected with said wheels to reduce a drive from said driving axle and transmit the reduced drive to said wheels.

In testimony whereof we have hereunto subscribed our names in the presence of two subscribing witnesses:

ALBERT E. COOK.
THOMAS VAN TUYL.

Witnesses:
FRANK A. BREMER, Jr.
FRED E. PAESLER.